United States Patent
Kolmanovsky et al.

(10) Patent No.: US 6,553,958 B1
(45) Date of Patent: Apr. 29, 2003

(54) ADAPTIVE TORQUE MODEL FOR INTERNAL COMBUSTION ENGINE

(75) Inventors: Ilya V Kolmanovsky, Ypsilanti, MI (US); Julia Helen Buckland, Dearborn, MI (US); Jing Sun, Bloomfield, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 71 days.

(21) Appl. No.: 09/833,237

(22) Filed: Apr. 11, 2001

(51) Int. Cl.⁷ .............................................. F02B 17/00
(52) U.S. Cl. ...................................... 123/295; 123/352
(58) Field of Search ................................ 123/352, 295, 123/294, 296, 305, 350, 351

(56) References Cited

U.S. PATENT DOCUMENTS

| | | | |
|---|---|---|---|
| 5,010,866 A | * 4/1991 | Ohata | 123/352 |
| 5,241,855 A | 9/1993 | Cullen et al. | |
| 5,577,474 A | 11/1996 | Livshiz et al. | |
| 5,726,892 A | * 3/1998 | Tang et al. | 701/110 |
| 5,975,048 A | * 11/1999 | Sivashankar et al. | 123/339.12 |
| 5,996,547 A | 12/1999 | Machida et al. | |
| 6,026,779 A | 2/2000 | Obata et al. | |
| 6,079,204 A | 6/2000 | Sun et al. | |
| 6,352,491 B2 | * 3/2002 | Mashiki et al. | 477/107 |
| 6,415,764 B1 | * 7/2002 | Manchester | 123/329 |

* cited by examiner

*Primary Examiner*—John Kwon
(74) *Attorney, Agent, or Firm*—Allan J. Lippa; John D. Russell

(57) ABSTRACT

A system and method for controlling a multi-cylinder internal combustion engine include determining a first engine operating variable using a model having at least one adjustable model parameter, measuring a second engine operating variable, and modifying the at least one adjustable model parameter based on a relationship between the first and second engine operating variables. In one embodiment, the first engine operating variable represents engine torque while the second engine operating variable is engine speed. An engine torque model and/or load torque model may be used to determine an estimated engine speed or speed trajectory which is compared to the actual engine speed or trajectory determined using an engine speed sensor. One or more model parameters for the engine torque and/or load torque model are adjusted when appropriate operating conditions are met based on a difference between the predicted or estimated engine speeds and the measured engine speeds.

11 Claims, 3 Drawing Sheets

ADAPTIVE TORQUE MODEL FOR INTERNAL COMBUSTION ENGINE

BACKGROUND OF THE INVENTION

1. Field of the Invention

The present invention relates to an adaptive torque model for use in controlling a multi-cylinder internal combustion engine.

2. Background Art

Torque-based engine control strategies use various engine actuators, such as airflow or throttle, fuel, spark, etc. to produce an engine torque consistent with a desired engine torque based on driver demand and current operating conditions. Closed-loop control requires feedback of the actual engine torque which is compared to the desired torque with the controller acting to reduce the error between the actual and desired torque. While a torque sensor may be used to provide the feedback signal, many applications do not use a torque sensor for a variety of reasons. In these applications, a torque model predicts or estimates the engine torque produced based on engine operating variables. The estimated engine torque is used as feedback to provide a "pseudo" closed-loop control, although the strategy is technically an open-loop control because the actual torque produced is not being measured. The torque model may be based on both analytical and empirical data for typical performance of a nominal engine.

With normal manufacturing variations and engine aging, the torque model may be less accurate and result in torque delivery errors. Unlike conventional control strategies where the driver could easily compensate for torque delivery errors by adjusting accelerator pedal position, more advanced control strategies may rely on an accurate engine torque determination to reduce emissions, improve fuel economy and/or improve driveability. For example, in direct injection spark ignition (DISI) engines, including direct injection stratified charge (DISC) engines, an inaccurate torque model may result in noticeable disturbances when engine operating variables change during combustion mode transitions.

SUMMARY OF THE INVENTION

An object of the present invention is to provide a system and method for controlling an internal combustion engine using an open-loop control strategy based on an adaptive model to estimate or predict a first engine variable with one or more model parameters adjusted using a second engine operating variable which is measured.

In carrying out the above object and other objects, features, and advantages of the present invention, a method for controlling a multi-cylinder internal combustion engine includes determining a first engine operating variable using a model having at least one adjustable model parameter, measuring a second engine operating variable, and modifying the at least one adjustable model parameter based on a relationship between the first and second engine operating variables. In one embodiment, the first engine operating variable refers to engine torque while the second engine operating variable is engine speed. An engine torque model and/or load torque model may be used to determine an estimated engine speed trajectory which is compared to the actual engine speed trajectory determined using an engine speed sensor. One or more model parameters for the engine torque and/or load torque model are adjusted when appropriate operating conditions are met based on a difference between the predicted or estimated engine speed trajectory and the measured engine speed trajectory. The engine is controlled using the adjusted torque model.

The present invention provides a number of advantages. For example, the adaptive model-based control strategy according to the present invention is capable of compensating for variation in engine operation, such as due to engine aging or manufacturing tolerances. An adaptive model used to estimate or predict one or more engine variables provides a more robust control strategy while reducing the number of necessary sensors. More accurate and consistent variable estimation may also improve driveability, particularly during combustion mode transitions which occur in more advanced engine control strategies.

The above advantages and other advantages, objects, and features of the present invention will be readily apparent from the following detailed description of the preferred embodiments when taken in connection with the accompanying drawings.

DETAILED DESCRIPTION OF THE PREFERRED EMBODIMENT(S)

As will be appreciated by those of ordinary skill in the art, the present invention is independent of the particular underlying engine technology and configuration. Likewise, the present invention is independent of the particular model used to estimate or determine an engine operating variable and the particular parametric representation of the model. As such, the present invention may be used in a variety of types of internal combustion engines to provide one or more adaptive models to determine or estimate various engine operating variables. For example, the present invention may be used in conventional engines in addition to direct injection stratified charge (DISC) or direct injection spark ignition (DISI) engines which may use VCT or variable valve timing mechanisms in combination with or in place of an electronically controlled throttle valve to control airflow, for example.

Figure 1:
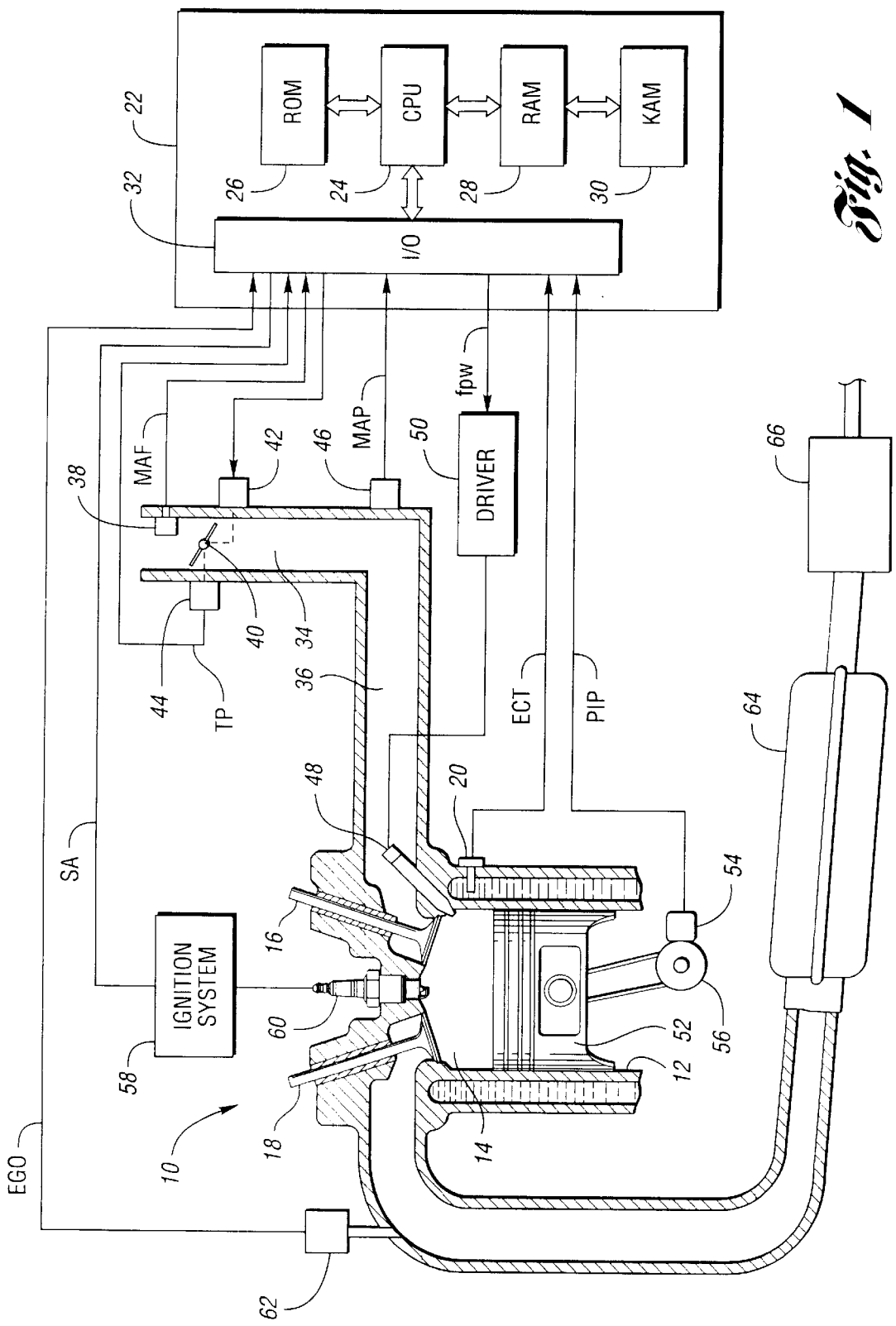
FIG. 1 is a block diagram illustrating operation of one embodiment of a system or method for controlling an engine using an adaptive model according to the present invention.

A block diagram illustrating an engine control system and method for a representative internal combustion engine according to the present invention is shown in FIG. 1. System 10 is preferably an internal combustion engine having a plurality of cylinders, represented by cylinder 12, having corresponding combustion chambers 14. As one of ordinary skill in the art will appreciate, system 10 includes various sensors and actuators to effect control of the engine.

One or more sensors or actuators may be provided for each cylinder 12, or a single sensor or actuator may be provided for the engine. For example, each cylinder 12 may include four actuators which operate the intake valves 16 and exhaust valves 18, while only including a single engine coolant temperature sensor 20.

The present invention may include a mechanical variable cam timing device of conventional design used to alter the timing of intake valves 16 and/or exhaust valves 18 to provide airflow control. Alternatively, intake valves 16 and/or exhaust valves 18 may be controlled by variable valve timing actuators, such as electromagnetic actuators, to provide airflow control, or a conventional cam arrangement may be used in conjunction with an electronically controlled throttle valve.

System 10 preferably includes a controller 22 having a microprocessor 24 in communication with various computer-readable storage media. The computer readable storage media preferably include a read-only memory (ROM) 26, a random-access memory (RAM) 28, and a keep-alive memory (KAM) 30. The computer-readable storage media may be implemented using any of a number of known memory devices such as PROMs, EPROMs, EEPROMs, flash memory, or any other electric, magnetic, optical, or combination memory device capable of storing data, some of which represents executable instructions, used by microprocessor 24 in controlling the engine. Microprocessor 24 communicates with the various sensors and actuators via an input/output (I/O) interface 32. As one of ordinary skill in the art will understand, controller 22 is a hardware device which implements one or more open-loop, closed-loop, and/or hybrid "controllers" using software to control various engine/vehicle operating variables, such as engine speed or vehicle speed using actuators to control airflow, fuel, and/or ignition timing. Of course, the present invention could utilize more than one physical controller, such as controller 22, to provide engine/vehicle control depending upon the particular application.

In operation of the illustrated embodiment, air passes through intake 34 where it may be distributed to the plurality of cylinders via an intake manifold, indicated generally by reference numeral 36. System 10 preferably includes a mass airflow sensor 38 which provides a corresponding signal (MAF) to controller 22 indicative of the mass airflow. In some embodiments of the present invention, a throttle valve 40 is used to modulate the airflow through intake 34 during certain operating modes. Throttle valve 40 is preferably electronically controlled by an appropriate actuator 42 based on a corresponding throttle position signal generated by controller 22. A throttle position sensor 44 provides a feedback signal (TP) indicative of the actual position of throttle valve 40 to controller 22 to implement closed loop control of throttle valve 40.

As will be appreciated by those of ordinary skill in the art, the present invention may also be used in unthrottled or throttleless direct injection spark ignition (DISI) engines where airflow may be controlled using appropriate valve timing. Whether or not the engine includes a physical throttle, such as throttle valve 40, the engine may be operated in various unthrottled modes. Such operation reduces pumping losses and increases engine efficiency which may result in improved fuel economy. Throttleless engines may include those having variable valve timing (VVT) where intake and exhaust valves are controlled electronically using electromagnetic actuators rather than a conventional cam arrangement. Likewise, engines having variable cam timing mechanisms may be operated at wide open throttle to reduce pumping losses with airflow control provided by modifying the cam timing. The present invention is also applicable to DISI engine configurations with conventional valve timing mechanisms which may also operate at wide open throttle in various modes, such as when operating in a lean burn or stratified mode.

As illustrated in FIG. 1, a manifold absolute pressure sensor 46 is used to provide a signal (MAP) indicative of the manifold pressure to controller 22. Air passing through intake manifold 36 enters combustion chamber 14 through appropriate control of one or more intake valves 16. As described above, intake valves 16 and exhaust valves 18 may be controlled directly or indirectly by controller 22 for variable valve timing or variable cam timing applications, respectively. Alternatively, intake valves 16 and exhaust valves 18 may be controlled using a conventional camshaft arrangement. A fuel injector 48 injects an appropriate quantity of fuel in one or more injection events for the current operating mode based on a signal (FPW) generated by controller 22 processed by driver 50.

For the DISI engine embodiment illustrated in FIG. 1, fuel injector 48 injects an appropriate quantity of fuel in one or more injections directly into combustion chamber 14. Control of the fuel injection events is generally based on the position of piston 52 within cylinder 12. Position information is acquired by an appropriate sensor 54 which provides a position signal (PIP) indicative of rotational position of crankshaft 56. Sensor 54 is preferably used to measure engine rotational speed.

According to the present invention, controller 22 implements a torque-based engine control strategy using an open-loop controller with an estimated engine torque determined using an appropriate model based on current engine operating and control variables. The estimated engine torque is compared to the desired engine torque with various engine actuators controlled to reduce the error between the estimated and desired torque. The present invention preferably uses a parameterized representation for the engine brake torque and for the load torque on the engine crankshaft. Differences between the estimated engine brake torque and estimated load torque are used to estimate corresponding changes in engine speed. Parameters of both models are preferably adjusted to adapt the models so that the predicted or estimated engine speed trajectory matches the measured engine speed trajectory as determined by sensor 54. Representative models for engine brake torque and load torque are described in greater detail below.

At the appropriate time during the combustion cycle, controller 22 generates a spark signal (SA) which is processed by ignition system 58 to control spark plug 60 and initiate combustion within chamber 14. Preferably, spark is maintained substantially at MBT, i.e., the timing that produces maximum torque for a given amount of air and fuel, whenever possible because these conditions generally result in better fuel economy.

Controller 22 (or a conventional camshaft arrangement) controls one or more exhaust valves 18 to exhaust the combusted air/fuel mixture through an exhaust manifold. An exhaust gas oxygen sensor 62 provides a signal (EGO) indicative of the oxygen content of the exhaust gases to controller 22. This signal may be used to adjust the air/fuel ratio, or control the operating mode of one or more cylinders. The exhaust gas is passed through the exhaust manifold and through a first catalyst 64 and second catalyst 66 before being exhausted to atmosphere.

As known, direct injection spark ignition engines such as illustrated in FIG. 1 may generally be operated in at least two modes of operation. To maintain stable combustion, the air/fuel ratio should be controlled within a first range for the stratified mode of operation and a second range for the homogeneous mode of operation. The specific air/fuel ranges may vary depending upon the particular application. As one example, stable combustion in the stratified mode may require air/fuel ratios between about 25:1 and about 40:1 while stable combustion in the homogeneous mode may require air/fuel ratios between about 12:1 and 20:1. Depending upon the particular engine configuration, various other operating modes with corresponding air/fuel ratios may also be used.

As described above, the present invention is independent of the particular engine variable being modeled and the particular model being used. A number of models for estimating engine brake torque and load torque on the crankshaft are known and have been validated experimentally. The present invention may be used with one or more known models which are then parameterized to adapt the models for variation or drift of engine operating characteristics.

According to one embodiment of the present invention, engine torque is estimated using a parameterized representation of a known model with parameters adjusted to adapt to changes in engine operation. Engine torque may be directly estimated using any of a variety of known models. For example, one known method for estimating engine torque is based on in-cylinder pressure measurements and cylinder geometry to estimate the engine indicated torque. Other methods include an estimation based on cylinder block vibrations measured by a piezoelectric accelerator and an estimation based on amplitude of crankshaft accelerations measured by the engine speed sensor.

According to the present invention, the engine torque model is modified using the following parameterized representation:

$$T_e = T_{e,n} \cdot \theta_1 + \theta_2, \tag{1}$$

where $T_{e,n}$ represents the nominal model of the engine torque as a function of measured and estimated engine variables and $\theta_1$ and $\theta_2$ represent adjustable scale and bias parameters used to adapt the model to account for changes in engine and/or vehicle operation. If $T_{e,n}$ is accurate, then $\theta_1$ should be equal to unity and $\theta_2$ equal to zero. Depending upon the particular application, different sets of bias and scale parameters may be used for various operational modes of the engine. For example, two different sets of bias and scale parameters may be used corresponding to the stratified and homogeneous combustion modes for DISI engines. Likewise, different sets of bias and scale factors may be used for different speeds and loads. The adjustable model parameters may be stored in a look-up table indexed by one or more operating or control variables. Equation (1) provides just one example of a possible torque representation according to the present invention which relies on the sum of the products of known functions times the unknown adjustable parameters. Other representations may also be used without departing from the spirit or scope of the present invention.

An accurate estimate of engine load torque in vehicle applications having a manual transmission may be provided by a known representative driveline model given by:

$$J_e \dot{\theta}_e = T_e - T_K - T_D - T_{aux} \tag{2}$$

$$J_d \dot{\theta}_d = T_K + T_D - T_v \tag{3}$$

where $\theta_e$ is the crankshaft angle of rotation and $\theta_d$ is the driveline angle of rotation, $T_K$ represents the elastic driveline torque given by $T_K = K(\theta_1 - \theta_d)$, $T_D = D(\dot{\theta}_1 - \dot{\theta}_d)$ is the damping driveline torque, $T_e$ represents the engine brake torque, $T_{aux}$ represents the torque due to auxiliaries (such as an air conditioner compressor (A/C)), $J_e$, $J_d$ are the engine and driveline inertias, and $T_v$ represents the external load torque (due to aerodynamics, rolling resistance, road grade, etc.).

If values for K and D are known, $T_K$ and $T_D$ can be estimated from the measures of $(\theta_e - \theta_d)$, $\dot{\theta}_e$, and $\dot{\theta}_d$, respectively. During normal driving conditions, the torque due to auxiliaries is not a significant contributor to total load torque and its main component, the A/C torque, can be estimated within 10 percent of the true value, except during the period when the A/C is just turning on. In summary, a good estimate of the load torque on the engine crankshaft $T_K + T_D + T_{aux}$ can be obtained under normal steady-state driving conditions (no gear shifts, A/C is in steady-state, etc.), provided the stiffness and the damping parameters K,D are known.

According to the present invention, the driveline model is modified using the following parameterized representation:

$$D = \theta_D \cdot D_n, \quad K = \theta_K \cdot K_n \tag{4}$$

where $D_n$ and $K_n$ are the nominal values described above and $\theta_D$ and $\theta_K$ represent adjustable parameters (multipliers) used to adapt the model under appropriate operating conditions.

For vehicles having an automatic transmission, the driveline model preferably considers the effects of the torque converter (t/c). A known model may be used to describe the powertrain dynamics when the torque converter lock-up clutch is unlocked or disengaged as follows:

$$J_e \dot{\omega}_e = T_e - T_{aux} - T_p \tag{5}$$

$$J_t \dot{\omega}_t = T_t - T_v \tag{6}$$

$$T_p = \frac{\omega_e^2}{K_c^2} \tag{7}$$

where $K_c$ is the capacity of the torque converter which is a function of the speed ratio of the torque converter turbine speed $\omega_t$ to engine speed $\omega_e$. The torque converter pumping torque and turbine torque are represented by $T_p$ and $T_t$, respectively with:

$$T_t = K_t \times T_p \tag{8}$$

where $K_t$ represents the torque ratio of the torque converter. If $\omega_t$ and $\omega_e$ are measured by corresponding sensors and the function $K_c$ is known, $T_p + T_{aux}$ can be estimated. The accuracy of this $T_p$ estimate has been shown to be within about 10 Nm during steady-state or slow transients for a powertrain with a 4.0 L engine. The accuracy deteriorates with faster transients due to transient fluid coupling dynamics effects in the torque converter.

According to the present invention, the model is modified using the following paramemtrized representation:

$$K_C = K_{C,n} \cdot \theta_c \tag{9}$$

where $K_c$, $K_{c,n}$, and $\theta_c$ represent the torque converter capacity estimate, its nominal value calculated from engine speed and turbine speed values, and the adjustable parameter (multiplier) used to adapt the model, respectively. A similar parameterized representation for the auxiliary torque $T_{aux}$ may also be used.

The present invention is independent of the particular form of the parameterizations. However, the parameterized representations should be based on a sum of the products of known functions multiplied by the adjustable parameters. For the illustrated embodiment of the present invention, engine indicated torque and load torque are represented using parameterized models with parameters of both models adjusted to adapt to changes in engine operation. However, the present invention may include adjusting any one or more parameter values for one or more parameterized representations of the modeled operating parameter(s).

Once parameterized representations of one or more engine or vehicle variables are determined, the representations are used to estimate values of an engine or vehicle operating parameter based on other current measured and estimated operating variables. The estimated values generated by the model are then used to predict or estimate another operating variable for which a measured value is available using a relationship between the modeled and measured variable (which may be implemented by another model). The estimated and measured values of the second operating variable may then be used to adjust the parameters of the parameterized representation of the model for the first variable to adapt the model for changes in engine or vehicle operation. For example, in one embodiment of the present invention, a parameterized engine torque model is used to estimate the engine torque (the first operating variable). Engine speed is a second operating variable for which a measured value is available based on the engine speed sensor signal. An engine speed model captures the relationship between engine speed and torque. The engine speed model uses the estimated engine torque and an estimated load torque to estimate changes in engine speed. The estimated engine speed trajectory is then compared to the actual measured engine speed trajectory with the error used to adjust the model parameters and adapt the model for the engine torque and/or load torque.

According to the present invention, one or more adjustable parameters are modified on-line as the engine operates to continually adapt the model to current operating characteristics. For this embodiment, an estimated engine speed may be determined based on the estimated engine indicated torque and load torque according to:

$$\hat{\omega}_e(k+1)=\hat{\omega}_e(k)+\Delta T(-L\cdot(\hat{\omega}_e(k)-\omega_e(k))+(1/J_e)\cdot(\hat{T}_e(k)-\hat{T}_1(k))), \quad (10)$$

where $\hat{\omega}_e(k)$ is the engine speed estimate at a sampling time instant k, $\Delta T$ is the sampling rate, L is a positive gain, $\hat{T}_e(k)$ is the estimate of the engine brake torque based on the current values of the adjustable model parameters and $\hat{T}_1(k)$ is the estimate of the load torque based on the current values of the adjustable model parameters (either $T_p+T_{aux}$ for the automatic transmission, or $T_K+T_D+T_{aux}$ for the manual transmission), $J_e$ is the engine inertia, and $\omega_e(k)$ is the measured value of the engine speed provided by the engine speed sensor.

The adjustable parameters are modified based on the following general rule. If $\hat{\theta}_i$ is an ith parameter that enters additively into either the expression for $\hat{T}_e$ or for $\hat{T}_1$ multiplied by a known factor $\phi_i$ then:

$$\hat{\theta}_i(k)=\hat{\theta}_i(k)-\gamma\cdot\phi_i(k)\cdot(\hat{\omega}_e(k)-\omega_e(k)). \quad (11)$$

where $\gamma$ is the adaptation gain.

The adaptation algorithm is preferably performed only under appropriate operating conditions such as normal driving, slow transients, torque converter unlocked (for automatic transmissions) and A/C in steady-state. The engine speed estimate is preferably reset to the measured engine speed at the beginning of each new time interval over which the adaptation is performed. For DISI engine applications, the engine speed estimate is preferably reset each time the combustion mode changes between homogeneous and stratified modes. In addition, due to errors in the parameterization and noise, the adaptation is preferably only enabled when the error between the engine speed estimate and the measured engine speed exceeds a corresponding threshold. Small errors may be caused by noise and/or modeling errors and are preferably not used to drive adaptation.

To improve parameter estimate convergence, the modeled engine speed value may be periodically reset to the measured engine speed value. For example, the estimated engine speed may be reset to the measured engine speed when the absolute value of the difference between the estimated and measured values exceeds a corresponding threshold. This threshold should be higher than the threshold used to enable adaptation.

Figure 2:
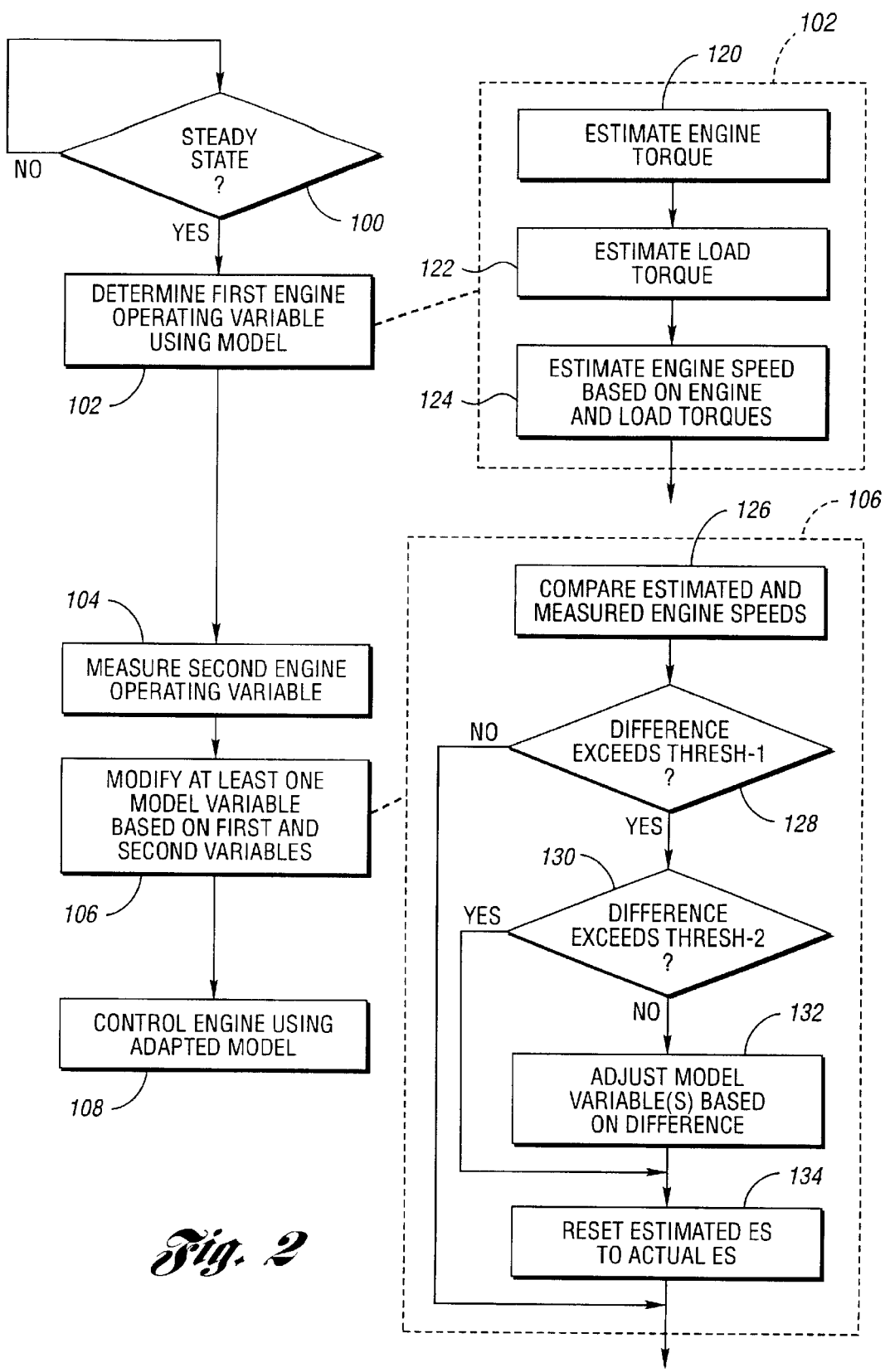
FIG. 2 is a flow diagram illustrating operation of one embodiment for a system or method for controlling an engine according to the present invention.

The diagram of FIG. 2 generally represents operation of one embodiment of a system or method according to the present invention. As will be appreciated by one of ordinary skill in the art, the diagram may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, systems or methods of the present invention are implemented primarily in software executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

Referring now to FIG. 2, block 100 represents determination of whether the engine is operating under steady-state conditions. According to the present invention, the adaptation algorithm is preferably enabled only under appropriate steady-state conditions such as normal driving, slow transients, torque converter unlocked (for automatic transmissions), A/C in steady operating, etc. The adaptation is not performed if any of the conditions are not met as determined by block 100. When the appropriate conditions have been met, a value for the first engine operating variable is determined using an associated model having at least one adjustable model parameter as represented by block 102. A second engine variable is then measured as represented by block 104 using an associated sensor. At least one adjustable model parameter is then modified based on a relationship between the first and second engine operating variables to adapt the model for variations due to engine aging or model inaccuracy as represented by block 106. The adapted model is then used for subsequent control of the engine as represented by block 108.

In one embodiment of the invention, the first engine operating variable is engine torque while the second engine operating variable is engine speed. The step of determining the first engine operating variable (engine torque) as represented by block 102 includes estimating engine torque as represented by block 120, estimating load torque at the engine crankshaft as represented by block 122, and estimating engine speed based on the engine and load torques as represented by block 124. In this embodiment, the estimated and measured engine speeds are compared as represented by block 126. If the difference between the estimated and measured engine speeds exceeds a first threshold as determined by block 128, then the adaptation may continue. Otherwise, control returns to block 108 with the current model parameters used to control the engine. If the difference between the estimated and measured engine speeds exceeds a second threshold as determined by block 130, the estimated engine speed is reset to the actual engine speed as represented by block 134. In addition, the estimated engine speed may be reset to the actual engine speed upon a change in combustion mode as described above. Periodically resetting the estimated engine speed to the actual engine speed as represented by block 134 may improve the convergence of the adjustable model parameters as illustrated and described in greater detail below.

If the difference between the estimated and actual (measured) engine speed exceeds the corresponding adaptation threshold as determined by block 128 and does not exceed the reset threshold as determined by block 130, the model parameters for the engine torque and/or load torque models are adjusted based on the difference as represented by block 132.

Figure 3A:
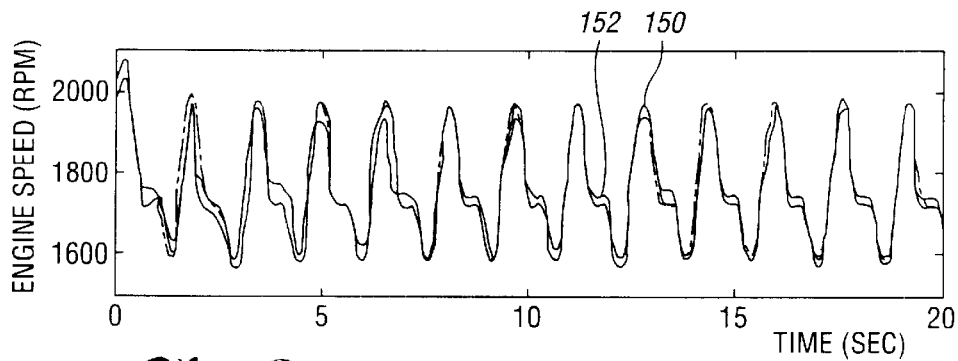
FIGS. 3a and 3b illustrate simulated results of one embodiment of the present invention for estimated and actual engine speed with associated parameter error during adaptation for a 1.8 L engine model operating in stratified mode.
Figure 3B:
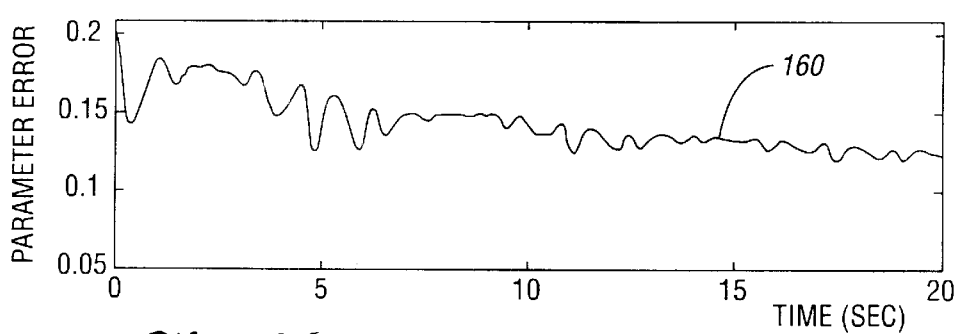

FIGS. 3*a* and 3*b* illustrate simulated results for one embodiment of the present invention of estimated and actual engine speed (FIG. 3*a*) with associated parameter error (FIG. 3*b*) during adaptation for a 1.8 L engine model operating in stratified mode. The simulated measured engine speed signal is represented by line 150. The estimated or modeled engine speed signal generated based on an engine torque model and load torque model as described above is represented by line 152. FIG. 3*b* illustrates the associated parameter error as represented by line 160 during the adaptation cycle. FIGS. 3*a* and 3*b* illustrate that the difference between the modeled engine speed and measured engine speed decays over time with the norm of the parameter error decaying as well. The simulation used to generate FIGS. 3*a* and 3*b* did not include periodic engine speed resetting.

Figure 4A:
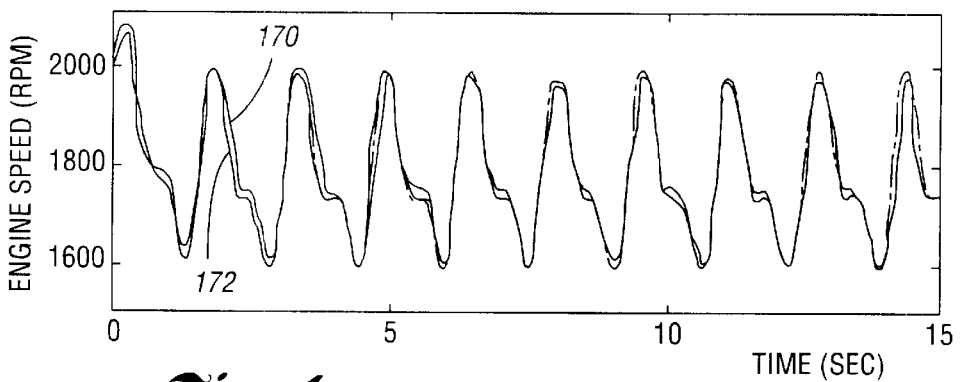
FIGS. 4a and 4b illustrate simulated results of another embodiment of the present invention for estimated and actual engine speed with associated parameter error with estimated engine speed periodically reset to measured engine speed for a 1.8 L engine model operating in stratified mode.
Figure 4B:
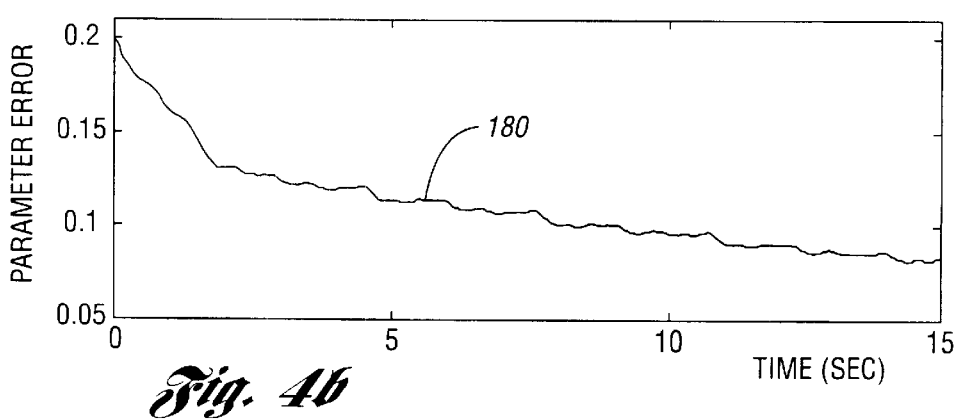

FIGS. 4*a* and 4*b* illustrate simulated results of another embodiment of the present invention using periodic resetting of the estimated engine speed to match the measured engine speed for a 1.8 L engine model operating in stratified mode. The measured engine speed is represented by line 170 with the estimated engine speed represented by line 172. Line 180 of FIG. 4*b* represents the associated parameter error. As illustrated in FIG. 4*b*, the parameter error is reduced by about 60% after only about 15 seconds compared to the error illustrated in FIG. 3*b* which shows the parameter error reduced by about 38% after about 20 seconds. As such, the engine speed resetting provides more rapid conversions of the model parameters.

As such, the present invention provides a system and method for robust control of an internal combustion engine using one or more adaptive models to accommodate changing engine or vehicle operation which may be caused by various factors including normal aging and wear.

While the best mode for carrying out the invention has been described in detail, those familiar with the art to which this invention relates will recognize various alternative designs and embodiments for practicing the invention as defined by the following claims.

What is claimed:

1. A method for controlling a multi-cylinder internal combustion engine, the method comprising:
   determining a first engine operating variable using a model having at least one adjustable model parameter;
   wherein the step of determining a first engine operating variable comprises:
      estimating engine torque for current operating conditions;
      estimating load torque for current operating conditions; and
      determining an estimated engine speed based on the estimated engine torque and estimated load torque;
   measuring a second engine operating variable using an associated sensor;
   modifying at least one adjustable model parameter based on a relationship between the first and second engine operating variables to adapt the model for variations in engine operation;
   comparing the estimated engine speed to an actual engine speed determined using an engine speed sensor; and
   wherein the step of modifying the at least one adjustable model parameter includes modifying the model parameter based on a difference between the estimated and actual engine speeds, wherein the step of modifying is performed only if the difference between the estimated and actual engine speeds exceeds a corresponding threshold.

2. A method for controlling a multi-cylinder internal combustion engine, the method comprising:
   determining a first engine operating variable using a model having at least one adjustable model parameter, wherein the step of determining a first engine operating variable comprises:
      estimating engine torque for current operating conditions;
      estimating load torque for current operating conditions; and
      determining an estimated engine speed based on the estimated engine torque and estimated load torque;
   measuring a second engine operating variable using an associated sensor; and
   modifying at least one adjustable model parameter based on a relationship between the first and second engine operating variables to adapt the model for variations in engine operation, wherein the estimated engine speed is periodically reset to actual engine speed as determined by an engine speed sensor.

3. A method for controlling a multi-cylinder internal combustion engine, the method comprising:
   determining a first engine operating variable using a model having at least one adjustable model parameter, wherein the step of determining a first engine operating variable comprises:
      estimating engine torque for current operating conditions;
      estimating load torque for current operating conditions; and
      determining an estimated engine speed based on the estimated engine torque and estimated load torque;
   measuring a second engine operating variable using an associated sensor; and modifying at least one adjustable model parameter based on a relationship between the first and second engine operating variables to adapt the model for variations in engine operation, wherein the multi-cylinder internal combustion engine is a direct injection spark ignition engine having a plurality of combustion modes of operation and wherein the estimated engine speed is periodically reset to the actual engine speed at each change of combustion mode of operation.

4. A method for controlling a multi-cylinder internal combustion engine, the method comprising:

determining a first engine operating variable using a model having at least one adjustable model parameter, wherein the step of determining a first engine operating variable comprises:

estimating engine torque for current operating conditions;

estimating load torque for current operating conditions; and determining an estimated engine speed based on the estimated engine torque and estimated load torque;

measuring a second engine operating variable using an associated sensor;

modifying at least one adjustable model parameter based on a relationship between the first and second engine operating variables to adapt the model for variations in engine operation;

determining an actual engine speed using an engine speed sensor;

comparing the actual engine speed to the estimated engine speed to determine an engine speed difference; and resetting the estimated engine speed to the actual engine speed when the engine speed difference exceeds a corresponding threshold.

5. A system for controlling a direct injection spark ignition multi-cylinder internal combustion engine operable in at least a homogeneous mode and a stratified mode using a torque model to determine an estimated engine torque, the system comprising:

an engine speed sensor for measuring actual rotational speed of the engine;

a controller in communication with the engine speed sensor, the controller determining an estimated engine torque based on current engine operating and control variables, determining an estimated engine load torque, determining an estimated engine speed based on the estimated engine torque and the estimated engine load torque, and adjusting at least one parameter of the engine torque model based on a difference between the estimated engine speed and the actual rotational speed of the engine.

6. The system of claim 5 wherein the controller determines a load torque corresponding to a manual or automatic transmission and an accessory load torque corresponding to operation of engine or vehicle accessories.

7. The system of claim 5 wherein the controller periodically resets the estimated engine speed to the actual rotational speed of the engine.

8. The system of claim 5 wherein the controller resets the estimated engine speed to the actual engine speed when the combustion mode changes between homogeneous and stratified operating modes.

9. The system of claim 5 wherein the controller resets the estimated engine speed to the actual engine speed when the difference between the actual and estimated engine speeds exceeds a corresponding error threshold.

10. The system of claim 5 wherein the controller adjusts the at least one model parameter only if the difference between estimated and actual engine speed exceeds a corresponding adapting threshold.

11. The system of claim 5 wherein the controller determines whether current operating conditions have attained steady state operation before adjusting the at least one model parameter.

* * * * *